United States Patent [19]

Skochdopole et al.

[11] Patent Number: 6,060,407

[45] Date of Patent: May 9, 2000

[54] ADVANCED INTEGRALLY FORMED LOAD SUPPORT SYSTEMS

[75] Inventors: Todd R. Skochdopole, Lawrenceville; David M. Daugherty, Grayson, both of Ga.

[73] Assignee: Atlantech International, Inc., Atlanta, Ga.

[21] Appl. No.: 09/124,355

[22] Filed: Jul. 29, 1998

[51] Int. Cl.⁷ .............................. D03D 9/00; B32B 5/12
[52] U.S. Cl. .................. 442/1; 442/50; 428/105; 428/107; 428/109; 428/198; 405/258; 297/452.48; 5/690
[58] Field of Search ................ 442/1, 50; 428/198, 428/105, 107, 109; 405/258; 297/452.48; 5/690

[56] References Cited

U.S. PATENT DOCUMENTS

| | | | |
|---|---|---|---|
| 2,871,218 | 1/1959 | Schollenberger | 525/440 |
| 2,919,467 | 1/1960 | Mercer | 264/167 |
| 3,023,192 | 2/1962 | Shivers, Jr. | 528/300 |
| 3,252,181 | 5/1966 | Hureau | 425/224 |
| 3,651,014 | 3/1972 | Witsiepe | 528/301 |
| 3,763,109 | 10/1973 | Witsiepe | 528/301 |
| 3,766,146 | 10/1973 | Witsiepe | 528/301 |
| 4,207,410 | 6/1980 | Burzin et al. | 528/288 |
| 4,331,786 | 5/1982 | Foy et al. | 525/408 |
| 4,455,337 | 6/1984 | Lloyd et al. | 428/134 |
| 4,469,738 | 9/1984 | Himelreich, Jr. | 428/198 |
| 4,469,739 | 9/1984 | Gretzinger | 428/198 |
| 4,563,384 | 1/1986 | Wiehe et al. | 442/153 |
| 4,869,554 | 9/1989 | Abu-Isa | 297/452.56 |
| 5,114,998 | 5/1992 | Golder et al. | 523/508 |
| 5,269,631 | 12/1993 | Mercer et al. | 405/258 |
| 5,436,052 | 7/1995 | Basse et al. | 428/109 |
| 5,885,686 | 3/1999 | Cederblad et al. | 428/107 |

FOREIGN PATENT DOCUMENTS

| | | |
|---|---|---|
| 621569 | 6/1961 | Canada . |
| 1458341 | 12/1976 | United Kingdom . |

*Primary Examiner*—Blaine Copenheaver
*Assistant Examiner*—John J. Guarriello
*Attorney, Agent, or Firm*—Jacobson, Price, Holman & Stern, PLLC

[57] ABSTRACT

A polymeric material in a grid configuration comprising an integral uniplanar or substantially uniplanar oriented grid formed from orientable thermoplastic polyester, polyamide or polyurethane elastomer. Such grid is used for load support systems in furniture, bedding and automotive applications.

23 Claims, 2 Drawing Sheets

ADVANCED INTEGRALLY FORMED LOAD SUPPORT SYSTEMS

BACKGROUND OF THE INVENTION

1. Field of the Invention

The present invention relates to the use of integrally formed polymeric grid structures possessing high structural integrity, elasticity and high tensile strength such that they are capable of being significantly, predictably and repeatedly deformed under stress without breaking, supporting significant load as they approach the limit of their elasticity and returning to substantially original shape when the deforming stress is removed. The present invention is suitable for use in load support applications requiring controlled elasticity and high durability such as in seat fabrication for aircraft, automobiles and other means of personal transportation; or in bedding and furniture fabrication or in similar load support systems used in commercial, industrial and recreational applications.

The present invention is economically superior to known competitive materials possessing comparable performance capabilities, which typically embody steel spring mechanisms and multiple component fabrications to achieve desired mechanical properties.

The present invention is mechanically and economically superior to known competitive materials embodying polymeric materials possessing elastic properties, which typically fail prematurely at their junction points if fabricated in a mesh or net configuration, or which typically embody substantially more material and substantially more capital and labor intensive processing than the present invention if fabricated in a woven or knitted or sheet configuration.

2. Description of the Prior Art

Load support systems used in seating, bedding and furniture fabrications and similar applications have evolved over all of recorded history. Initial structures were rigid, fabricated of wood, stone, metal and the like, and were typically covered with some sort of cushioning material to improve comfort in seating or sleeping or to achieve similar effects in other applications. Limited amounts of flexibility were later incorporated in load support systems through use of woven strips and filaments of natural materials such as cotton, jute and the like which were typically fabricated to form sheet like suspension systems mechanically fastened at their perimeter to rigid frames. Various spring steel mechanisms were later incorporated to increase the elasticity of the load support system, to improve its ability to return to substantially original shape when loads were removed, and do so after numerous load cycles, and to improve useful service lives. The use of rigid wire platforms connected to rigid wood or steel frames via extensible steel spring mechanisms and then covered with various cushioning materials remains today the preferred embodiment for achieving comfort and durability in use in most seating applications. It is, however, a relatively expensive embodiment involving numerous independent fabrication processes, considerable use of capital assets and labor resources in fabrication and in material handling and considerable material content. The use of steel material is also not optimal from the standpoint of weight, while the elastomeric suspension system of this patent specification has the advantage of providing improved performance together with structural light weight.

As numerous polymeric materials have been developed and improved, considerable attention has been devoted to using such materials to displace the traditional materials and traditional fabrication methods referenced above—primarily to reduce cost, but also to achieve performance, aesthetic and other benefits. Several such advances have been made in load support systems particularly in using polymeric materials to form rigid frames and to create cushioning materials suitable for use in seating, bedding and similar applications.

Analogous advances have also been sought in substitution of polymeric materials for the rigid wire platforms and spring steel connectors which are referenced above. For instance, woven and knitted polymeric filaments, straps and tapes have been substituted for the rigid wire platforms used in seating applications, and in some instances such materials have also substituted for spring steel connectors. In use such polymeric materials are mechanically fastened to rigid frames or are connected to rigid frames with spring steel connectors. As materials possessing improved elastic and elastic recovery properties have been developed, such embodiments have achieved some market acceptance and have successfully displaced traditional materials and traditional fabrication practices in some applications. However, most such displacement has been in lower cost, lower quality applications in which performance and durability tradeoffs have been accepted by users.

Attempts have also been made to use integrally formed polymeric mesh or net materials with elastic properties in substitution for rigid wire platforms and spring steel connectors and their competitive equivalents. However, these have not been successful to date in that such materials characteristically fail at the junction points of the mesh or net structure when subjected to high levels of deforming stress, or repeated deforming stress—or require excessive amounts of expensive material in their junctions to dissipate stress levels.

U.S. Pat. No. 4,869,554 to Abu-Isa discloses a vehicle seat assembly comprising elastomeric filaments woven into a net configuration and prestretched across a rigid frame.

U.S. Pat. No. 4,469,739 to Gretzinger discloses oriented woven furniture support materials made in part from elastomeric monofilament and in part from yarn. These furniture support materials can be made by weaving the elastomer in a first direction and the yarn in a second direction perpendicular to the first direction. The two series of strands may be bonded or fused at the crossover points. Both the Gretzinger and Abu-Isa processes produce a support material which is not integrally formed and where the junctions are biplanar, being made by strands which cross over each other at intersections.

U.S. Pat. No. 4,469,738 to Himelreich, Jr. discloses a furniture support material in a net configuration including crossed strands of oriented thermoplastic elastomers, such as a copolyetherester, which are bonded to each other at points at which they cross. This support material can be made by extrusion through a pair of close fitting concentric tubular dies one or both of which rotate in an opposing direction to the other or by weaving of filaments. The Himelreich process produces a biplanar structure in which the nodes, or points at which the strands cross, have a thickness which may be as great as the thickness of both individual strands. Such structures have inherent thickness variation with substantial continuity of each strand at the crossover points, producing biplanar junctions with reduced capability to resist breakage at high and/or repeated load levels. Himelreich does not disclose making such materials in a uniplanar grid configuration.

U.S. Pat. No. 3,252,181 to Hureau discloses a method for extruding polymeric material through reciprocating dies in which the polymeric material is periodically prevented from leaving the die at points which correspond to desired voids or openings and then allowed to leave the die at such points thereby creating an apertured material in a grid configuration which may be substantially uniplanar in cross section. Embodiments and methods disclosed by Hureau may be used for producing the integrally formed grid of the present invention.

U.S. Pat. No. 5,114,998 to Golder et al disclosed talc filled thermoplastic polyester compositions which have been modified by the addition of a butadiene-based impact modifier stabilized against degradation by the addition of a diphenylamine compound. The polyesters may be copolyetheresters which may be used to produce the present invention.

The materials of the present invention are manufactured from a continuous process which is inherently different from and economically superior to the weaving process disclosed in U.S. Pat. No. 4,469,739 which requires many independent manufacturing steps to convert raw material to final products. The materials of the present invention also differ from the furniture support material which is disclosed in U.S. Pat. No. 4,469,738. The materials of the present invention are formed from starting materials which are uniplanar or substantially uniplanar structures, whereas U.S. Pat. No. 4,469,738 discloses use of substantially biplanar structures made in accordance with U.S. Pat. No. 2,919,467. Integrally formed polymeric grid structures which are substantially uniplanar may be produced by methods disclosed in U.S. Pat. No. 3,252,181. When such integrally formed polymeric grid structures are extruded in a substantially uniplanar configuration and then mechanically stretched, the polymeric molecules comprising the materials experience uniform in-plane deforming forces which cause them to align themselves around the apertures in continuous repeating symmetrical three dimensional patterns centered on a median plane. However, if such integrally formed polymeric grid structures are extruded in a substantially biplanar configuration and then mechanically stretched, the polymeric molecules Comprising the materials experience widely varying deforming forces across their cross section, with such force applied as offset moments relative to the median plane of the material, the result of which is diminished suitability for use in load support applications as are intended for the present invention.

SUMMARY OF THE INVENTION

It is an object of the present invention to use as a load support system an integrally formed polymeric grid structure which is inexpensively manufactured by an extrusion and mechanical stretching process and which is capable in use of being significantly, predictably and repeatedly deformed under stress, supporting significant load at the limit of its elasticity and returning to original shape when the deforming stress is removed.

It is an object of the present invention to produce a material suitable for use in seat fabrication for aircraft, automobiles and other means of transportation, or in bedding and furniture fabrication or in similar load support systems used in commercial, industrial and recreational applications.

It is an object of the present invention to use as a load support system an integrally formed grid structure which is manufactured via an extrusion and mechanical stretching process which causes the polymeric material in the junctions of the grid structure and in the zones of the grid structure which interconnect the junctions to be substantially symmetrical about a median plane such that the deforming forces which such structures experience in use are not applied as offset moments relative to the median plane of the material in any part of the grid structure, and particularly are not so applied in the junction zones of the grid structure.

It is an object of the present invention to use as a load support system a grid structure which integrally formed and which is not prone to fail at its junctions when repeatedly subjected to significant deforming stresses.

It is an object of the present invention to use as a load support system integrally formed grid structure which is substantially planar at its interface with other materials which it supports or confines or restrains in use so as to most uniformly distribute stress at the point of such interface and so as to reduce friction or resistance to relative movement between the support material and the supported material.

These and other objects of the present invention will become apparent with reference to the following specification and claims.

BRIEF DESCRIPTION OF THE DRAWINGS

The FIG. 1 is a perspective view of a use of the integrally formed polymeric grid as described in the present invention, illustrated as a seat bottom with the schematic frame of the seat partially shown.

The FIG. 2 is an embodiment where a built-in integral frame is required.

Figure 3:
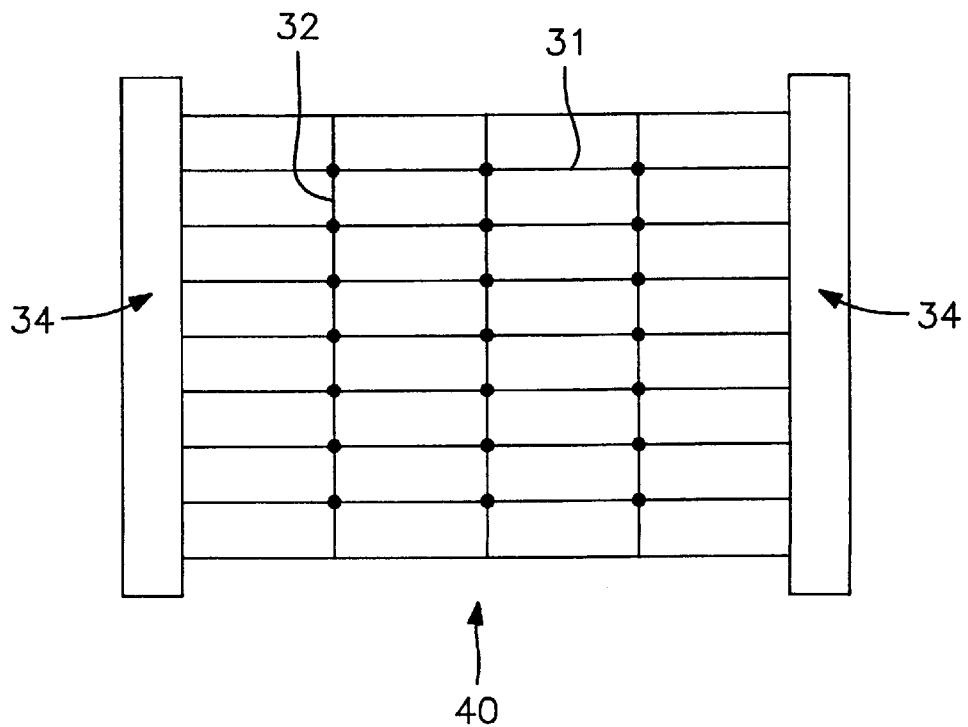

The FIG. 3 is another embodiment with only two opposite sides integrally framed.

DETAILED DESCRIPTION OF THE DRAWINGS AND THE PREFERRED EMBODIMENTS

The present invention relates to a grid which has been extruded in an integral configuration and then stretched in at least one or two directions made from an orientable thermoplastic elastomer.

The orientable thermoplastic elastomer used in the grid structure of the present invention can be a copolyetherester elastomer, a polyesterurethane elastomer or a polyesteramide elastomer and is preferably a copolyetherester elastomer. Each of these classes of polymeric materials are made up of long chain molecules, with two distinct segments alternating along the length of the chain. When processed under the correct temperature and orientation conditions, the resulting material consists of hard crystalline segments that provide high strength and stiffness, and softer amorphous segments that provide elasticity. Thus, these classes of materials are preferred because they can provide the high tensile strength, high modulus of elasticity and high elastic limit required for the support of the described load support systems.

The copolyetheresters are either commercially available or can be prepared by processes which are well known in the art as described, for example, in U.S. Pat. Nos. 3,651,014, 3,763,109, 3,766,146 and 5,114,998. Commercially available products include Hytrel® from Dupont and Riteflex® (e.g., Riteflex® T640, T655 or T677) from Hoechst Celanese. The copolyetherester elastomers which can be used in the present invention consist of a multiplicity of recurring long chain ester units and short chain ester units joined head to tail through ester linkages, said long chain units being represented by the formula

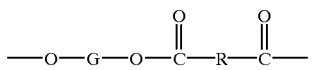

and said short chain units being represented by the formula

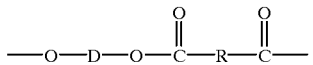

where G is a divalent radical remaining after the removal of the terminal hydroxyl groups from a poly(alkylene oxide) glycol, a long chain polymeric glycol having an average molecular weight in the range from about 600 to 6,000, R is a divalent hydrocarbon radical remaining after removal of the carboxyl groups from dicarboxylic acid having a molecular weight less than about 300, and D is a divalent radical remaining after removal of hydroxyl groups from low molecular weight diols having a molecular weight less thar about 250. The short chain ester units in the copolyetherester provide about 25 to 95% of the weight of the copolyetherester.

Thermoplastic polyesterurethane elastomers such as disclosed by Schollenberg in U.S. Pat. No. 2,871,218 can be used in the present invention. They may be prepared by reacting a polyester with a diphenyl diisocyanate in the presence of a free glycol. The preferred polyester is an essentially linear hydroxyl terminated polyester having a molecular weight between 600 and 1200 and an acid number less than 10.

The units formed by reaction of the free glycol with the diisocyanate will constitute the short-chain urethane units. Similarly, the units formed by reaction of polyester with diisocyanate constitute the long-chain urethane units.

Thermoplastic polyetherester amide elastomers, such as disclosed by Foy (U.S. Pat. No. 4,331,786) and Burtin (U.S. Pat. No. 4,207,410), which can be used in the instant invention are represented by the following formula

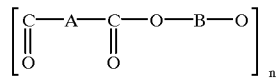

wherein A is a linear saturated aliphatic polyamide sequence, and B is a polyoxyalkylene sequence formed from linear or branched aliphatic polyoxyalkylene glycols. The polyamide sequence A consists of a plurality of short-chain amide units. The polyoxyalkylene sequence B represents a long-chain unit.

The grid of the present invention is made from a sheet of polymeric material which is mechanically stretched in at least one direction after the extruded sheet material is transformed from a molten to a solid state. The polymeric material may be extruded in a substantially uniplanar sheet form, then punched, dimpled or embossed so as to create controlled yield points when mechanically stretched, and then so stretched to form a finished grid structure with the requisite properties. The polymeric material may also be extruded through a reciprocating die so as to create a substantially uniplanar sheet material which is perforated, dimpled or embossed so as to create controlled yield points as described above then stretched as described above. In either variant, the extruded material may be a flat sheet or may be a cylindrical tube which when slit on its longitudinal axis may be opened to form a flat sheet or may be formed in any other manner which is capable of being transformed to a flat sheet prior to mechanical stretching. Further known treatment like thermal curing of the stretched product or other process steps may take place to improve the final properties of the product in use.

The thermoplastic elastomer can be formed into a uniplanar or substantially uniplanar grid configuration using a method as described in U.S. Pat. No. 3,252,181 to Hureau whereby a grid is formed by extruding the elastomer through an extrusion die having a narrow extrusion outlet, a comb-like member having a plurality of spaced teeth and arranged to be displaceable in relation to the outlet of the die between a first position in which the teeth of the comb-like member interfere with the narrow elongated outlet of the die, thereby obstructing it at a plurality of areas spaced along the elongated outlet, and a second position in which the teeth of the comb-like member are outside or partially outside of the die outlet and the outlet is unobstructed or partially unobstructed, and intermittently displacing the comb-like member at successive predetermined times from its first position to its second position, and back to its first position. Typically, the tubular material so formed is then passed over a mandrel and through a tank filled with cooling water and slit open to form a continuous flat "sheet" of material in a grid configuration.

Machine direction orientation of the grid having a plurality of plastic strands formed in a pattern with openings there between is accomplished by reheating the grid to a temperature preferably of about 100 to 350° F. and stretching the grid along its longitudinal axis by moving the grid over two or more rolls with high friction surfaces and with the downstream rolls turning at a rate faster than the upstream rolls. The degree of stretching imparted to the grid is determined by the relative speeds of the respective rolls. The grid is typically stretched from about 1.5 to 6 times its original length. If a grid with only machine direction orientation is desired, the grid is then cooled to room temperature. If transverse direction orientation is also desired, the grid can be cooled and reheated or maintained at a temperature preferably of 100 to 350° F. and then stretched from about 1.5 to 6 times its original dimension in the transverse direction. The grid is then cooled to room temperature.

If heat setting is desired to obtain further required properties of the grid material, it can be further heated, prior to cooling and after the last stretching process, at a temperature exceeding by a range of 20 to 150° F. the temperature at which the last stretch was made.

The final product has a modulus at least equal to 20 MegaPascal, preferably 100 MegaPascal, as measured per ASTM D412.

In order to achieve the high strength, high modulus, recovery and other desirable properties, a minimum amount of material in the machine direction is required. From an economic standpoint, it is preferred to use as little material as possible. The preferred structure for providing the minimum amount of material is to use a relatively large number of strands with a relatively small cross-sectional area in the machine direction. This type of structure will retain a large portion of its strength, modulus and recovery properties if a strand is inadvertently damaged during use. If there are few strands of large cross-sectional area, a large portion of the properties are lost if a strand is damaged; on the other hand, if the strands are too small, they can be too easily damaged. Therefore, it is desirable to have about 100 to 300 machine direction strands/meter, preferably about 150 to 250 machine direction strands/meter, each with a strand cross-section of about 0.01 to 2.0 mm$^2$, preferably about 0.2 to 1.0 mm$^2$.

The main purpose of the transverse direction strands is to prevent the separation of the machine direction strands. Thus, there are two properties of the transverse direction strands that are important. First, the separation between transverse direction strands, because these provide anchor points or junctions where they intersect with the machine direction strands. In a structure which has uniplanar junctions, in which each individual machine direction strand is produced through continuous extrusion through a slot, each section of a machine direction strand between transverse direction strands is isolated from adjacent sections of the same machine direction strands. Therefore, compared to a structure without uniplanar junctions, the transverse direction strands may be separated by a larger distance due to the higher strength and resistance which is shown by this type of junctions. From an economic viewpoint in use as seat and furniture load support systems it is desirable to optimize the number of transverse direction strands, as well as to optimize their cross-sectional area, and it has been found desirable to have a structure containing about 5 to 50 transverse direction strands/meter, preferably about 7 to 20 transverse direction strands/meter. The cross-section of these transverse direction strands is desirably about 1 to 10 $mm^2$, preferably about 2 to 4 $mm^2$. Second, for a given separation between the transverse direction strands, a high elastic modulus is desired, so that when the structure is loaded, the transverse direction strands are capable of resisting deformation, and therefore prevent the machine direction strands from separating at the anchor points.

The advantages of a integral and uniplanar or substantially uniplanar grid structure include reduced friction in use as compared to a biplanar net structure. In a seating system comprising the present invention, some type of material may cover the elastomeric support, or it may be used without a cover. During use, the elastomeric material support will deflect, along with either the covering material adjacent to the elastomeric material, or the surface of the occupant. Since neither these materials in contact with the elastomeric support are connected and thus are able to slide past one another, friction is created between the two surfaces. A biplanar structure, due to its inherent thickness variation along its length, is subject to higher frictional forces, and thus tends to be more susceptible to abrasion. This problem is eliminated in a uniplanar structure, resulting in reduced wear and greater durability of both the load support element and the covering material. This is particularly important when a larger number of junctions are included in the grid structure.

The uniplanar grid structure allows for the repeated transfer of load between machine and cross machine direction strands in the most efficient way, reducing the probability of breakage at the junctions and therefore increasing the life of the product in use. In particular breakage of the structure at the crossover points between machine direction and cross machine direction strands is avoided, where breakages are likely to happen especially in case of repeated loads with a very high number of cycles as is the case in use for instance in automotive seat applications. This is also more critical for all those cases where the machine direction strands are oriented and the cross machine direction strands are unoriented, where the unoriented cross machine direction strand in a biplanar structure protrudes substantially outside the plane of the machine direction strands, taking a substantial amount for load on a plane which is separate from the plane of the machine direction strands.

The grid structure of this invention allows for transfer of stress on the same plane between the machine direction and the cross machine direction strand, whereby no torsion is induced in the structure by shear or horizontal load applied to the cross machine direction strands as is described above for the biplanar structures. This property is advantageous in that use as load support subjects the grids to repeated loads or fatigue wherein increased life in use for the achievable by substantial reduction of stress offset at the junctions.

The oriented thermoplastic elastomeric grid used in the present invention is useful in the manufacture of seat backs and bottoms intended for use in automobiles as well as conventional household and industrial furniture. The combination of the properties possessed by the load support material of the present invention, e.g., high strength, high extension, the ability to recover its original dimensions when the load is removed, reduced friction and reduced stress concentration at the junctions, make these materials well suited for automotive seating and similar applications.

These materials are also useful as straps or strips to reinforce partial or selected areas of seating and furniture, like for instance mattresses.

Figure 1:
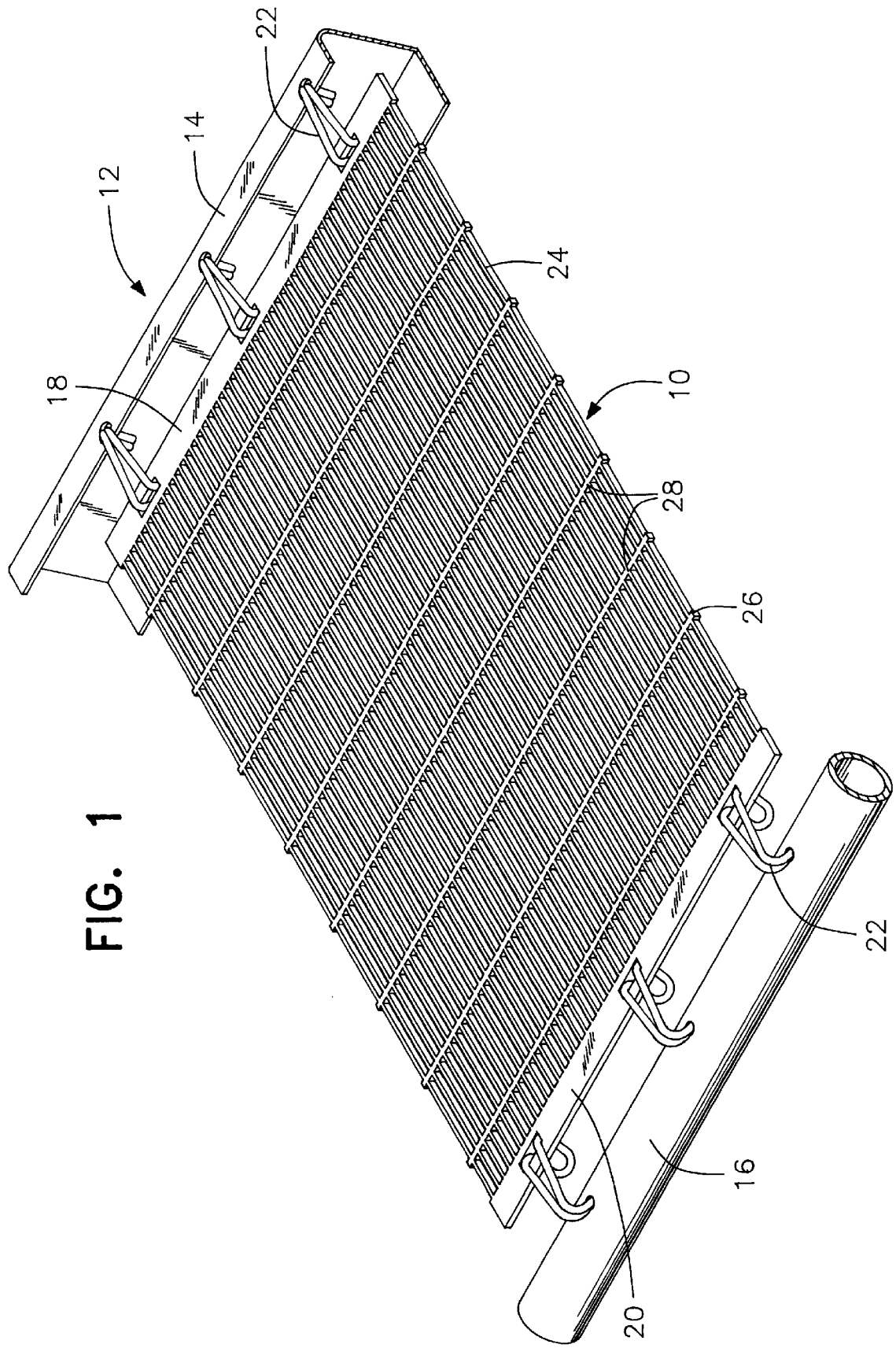

Referring to FIG. 1, an elastomeric grid 10 of the present invention is illustrated as a seat bottom of a seat 12 having opposed frames 14 and 16. The elastomeric grid 10 is attached to opposed elongated members 18 and 20 which are attached to the frames 14 and 16, respectively, by a plurality of hooks 22. The elastomeric grid 10 includes a plurality of machine direction strands 24 and a plurality of transverse direction strands 26 which intersect junctions 28.

Figure 2:
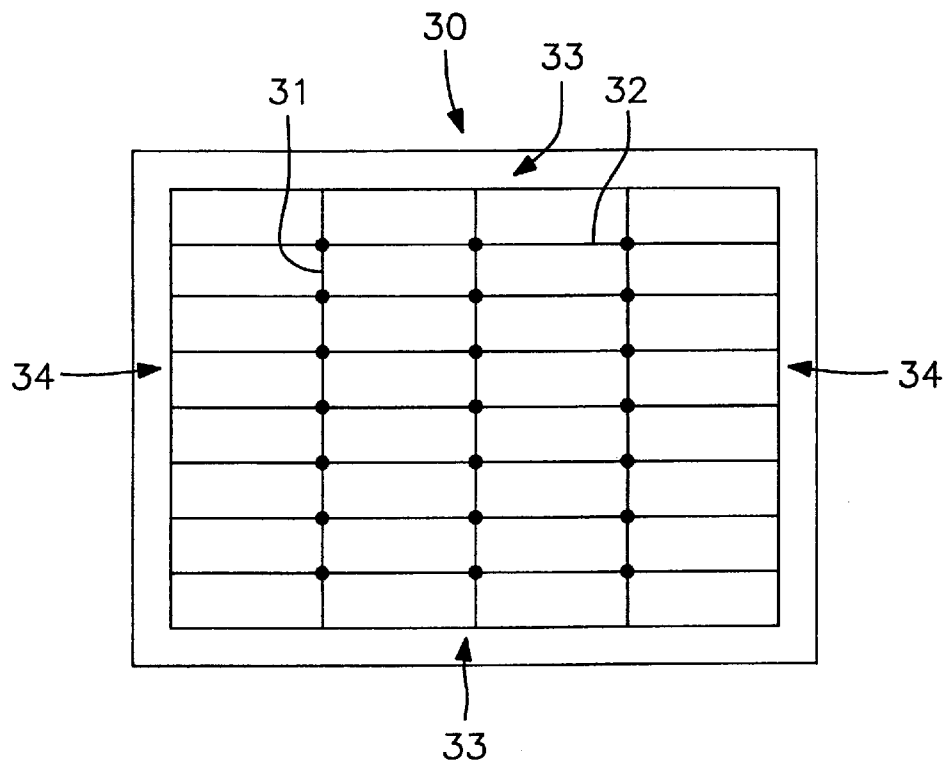

Referring to FIG. 2, an elastomeric integral grid structure 30 of the present invention is illustrated, being formed by thinner strands 31 and 32 running in opposite directions, surrounded by heavier and larger strands 33 and 34, with which they integrally and uniplanarly merge. The strands 33 and 34 are advantageously made in the form of a surrounding integral frame which may advantageously be easily stapled, for instance, to furniture seating.

Referring to FIG. 3, it is illustrated a different embodiment 40 where only two integral larger strands or bands 34 are formed in the structure on opposing sides. This structure is, for instance, advantageous where stapling or holding elements are required only on two opposing sides. It should be understood that the electomeric grid of this invention may, in any of its forms, be advantageously molded or stapled or clamped or otherwise incorporated into seats, bending, furniture and the like in any known way without altering or limiting in any way the scope of this invention.

Having described the invention, many modifications thereto will become apparent to those skilled in the art to which it pertains without deviation from the spirit of the invention as defined by the scope of the appended claims.

We claim:

1. A load support material in a grid configuration comprising an integrally formed, uniplanar or substantially uniplanar structure having machine and transverse direction strands formed by extruding and mechanically stretching an apertured sheet made of elastomer, wherein the integrally formed grid structure has about 100 to 300 machine direction strands/meter and the machine direction strands each have a cross-section of about 0.05 to 2.0 $mm^2$ and wherein the integrally formed grid structure has about 5 to 50 transverse direction strands/meter and the transverse direction strands each have a cross-section of about 1 to 10 $mm^2$.

2. The load support material of claim 1 wherein the integrally formed grid structure is made by extrusion of a thermoplastic elastomer through a die in which the uniplanar or substantially uniplanar material leaving the die is periodically interrupted at locations which will correspond to openings in the finished grid structure.

3. The load support material of claim 1 wherein the integrally formed grid structure is made by extrusion of a thermoplastic elastomer in a uniplanar or substantially uniplanar sheet form in which holes or openings are substantially formed, for instance, inter alias by punching at locations which will correspond to openings in the finished grid structure.

4. The load support material of claim 1 wherein the thermoplastic elastomer is selected from the group of polymers consisting of copolyetheresters, polyesterurethane and polyesteramide.

5. The load support material of claim 1 wherein the integrally formed grid structure is stretched in any of the two directions or in both the two directions.

6. The load support material of claim 5 wherein the molecules constituting the integrally formed grid structure are oriented by stretching the material from about 1.5 to 6 times its original dimension in any of the stretching directions.

7. The load support material of claim 1 wherein the modulus of the material is equal to 20 MegaPascal or higher in at least one of the machine direction and the transverse direction strands.

8. A seating support material used in furniture fabrication which is constituted by the load support material of claim 1.

9. A seat bottom made from the load support material of claim 1.

10. A seat back made from the load support material of claim 1.

11. An automotive seat made from the load support material of claim 1.

12. Bedding made from the load support material of claim 1.

13. The load support material of claim 1 wherein the integrally formed grid structure has about 150 to 250 machine direction strands/meter and the machine direction strands each have a cross-section of about 0.2 to 1.0 mm$^2$ and wherein the integrally formed grid structure has about 7 to 20 transverse direction strands/meter and the transverse direction strands each have a cross-section of about 2 to 4 mm$^2$.

14. A load support material in an integrally formed grid configuration which, when subjected to repeated deformation under stress, returns to its original shape when the stress is removed, comprising a uniplanar or substantially uniplanar structure having a plurality of polymeric machine and transverse direction strands intersecting at a plurality of junctions and formed in a pattern having openings therebetween, the polymeric strands being formed from thermoplastic elastomer, the structure being oriented in the longitudinal or transverse direction, the junctions being capable of withstanding repeated deforming stresses without failure, wherein the integrally formed grid structure has about 100 to 300 machine direction strands/meter and the machine direction strands each have a cross-section of about 0.05 to 2.0 mm$^2$ and wherein the integrally formed grid structure has about 5 to 50 transverse direction strands/meter and the transverse direction strands each have a cross-section of about 1 to 10 mm$^2$.

15. The load support material of claim 14 wherein the integrally formed grid structure is oriented in any or both of the longitudinal and transverse directions.

16. The load support material of claim 14 wherein the integrally formed grid structure is oriented by stretching it from about 1.5 to 6 times its original dimension in any direction.

17. The load support material of claim 14 wherein the pattern of apertures forming the grid structure is diamond, square, rectangular, oblong or octagonal.

18. A furniture support material made from the load support material of claim 14.

19. A seat bottom made from the polymeric material of claim 14.

20. A seat back made from the load support material of claim 14.

21. An automotive grid made from the load support material of claim 14.

22. Bedding made from the load support material of claim 14.

23. The load support material of claim 14 wherein the integrally formed grid structure has about 150 to 250 machine direction strands/meter and the machine direction strands each have a cross-section of about 0.2 to 1.0 mm$^2$ and wherein the integrally formed grid structure has about 7 to 20 transverse direction strands/meter and the transverse direction strands each have a cross-section of about 2 to 4 mm$^2$.

* * * * *